Feb. 24, 1925.

B. L. MAYER 1,527,367

MEANS FOR LUBRICATING LEAF SPRINGS

Filed May 27, 1921

Inventor
Bernard L. Mayer.
By Morrill & Keeney.
Attorneys

Patented Feb. 24, 1925.

1,527,367

UNITED STATES PATENT OFFICE.

BERNARD L. MAYER, OF HALES CORNERS, WISCONSIN.

MEANS FOR LUBRICATING LEAF SPRINGS.

Application filed May 27, 1921. Serial No. 473,121.

*To all whom it may concern:*

Be it known that I, BERNARD L. MAYER, a citizen of the United States, and resident of Hales Corners, in the county of Milwaukee and State of Wisconsin, have invented new and useful Improvements in Means for Lubricating Leaf Springs, of which the following is a description, reference being had to the accompanying drawings, which are a part of this specification.

This invention relates to improvements in means for lubricating leaf springs.

One of the objects of the invention is to provide means for the purpose specified of such construction that a lubricant may be forced under pressure between the leaves of the spring so that the entire spring will be effectively lubricated.

The invention contemplates providing longitudinally extending oilways in the leaves of the spring and a further object of the invention is to provide a clamping bolt of such construction that it is not only serves to clamp the leaves of the spring together but also serves as means for conveying the lubricant to the respective oilways formed in the leaves of the spring.

The invention consists in the novel constructions and arrangements to be hereinafter described and claimed for carrying out the above stated objects and such other objects as will appear from the following description of a certain preferred embodiment illustrated in the accompanying drawings, wherein—

Figure 1:
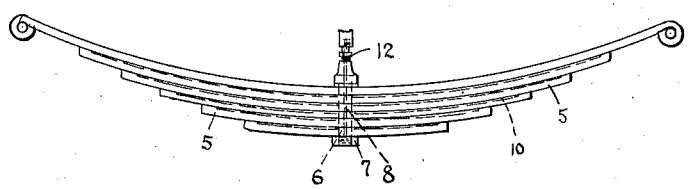
Figure 2:
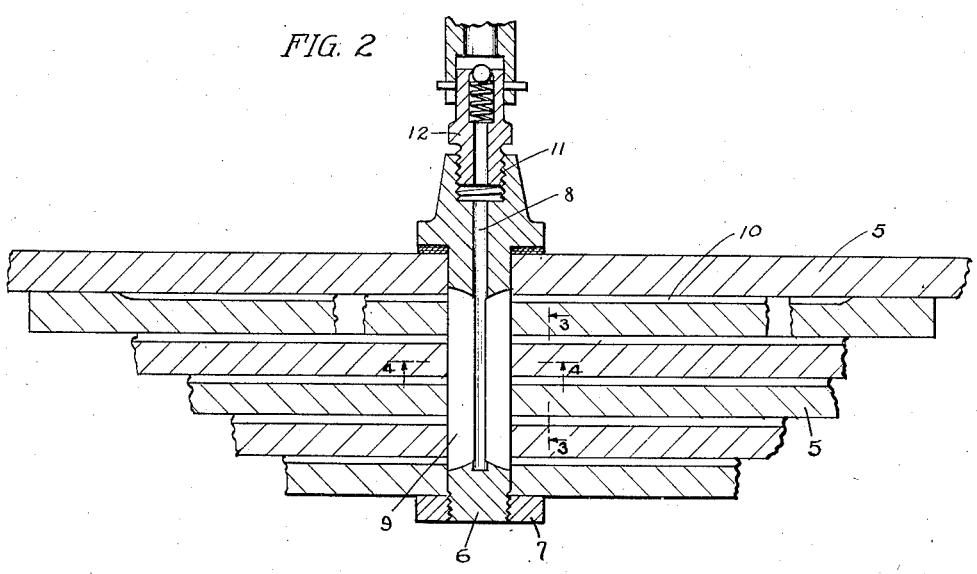
Figure 3:
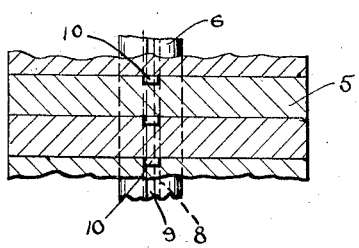
Figure 4:
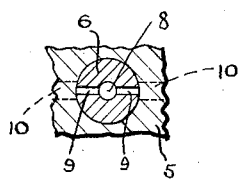

Fig. 1 is a side elevational view of a spring equipped with an arrangement embodying the principles of the invention;

Fig. 2 is a sectional view, on an enlarged scale, of a fragmentary portion of the spring shown in Fig. 1, taken longitudinally with respect to the spring, and Figs. 3 and 4 are sectional views taken respectively on the lines 3—3 and 4—4 of Fig. 2.

Like characters of reference designate like parts in the several views.

Referring to the drawings, it will be seen that the several leaves 5, 5 of the spring are clamped together by a bolt 6 provided with a nut 7. The bolt 6 is normally positioned substantially vertically and is provided with a longitudinally extending bore or oilway 8 and a pair of laterally extending outlet slots 9 which communicate with said oilway. Between adjacent leaves of the spring is provided a longitudinally extending oilway which communicates with the slots 9, the preferred arrangement being to provide a longitudinally extending shallow groove 10 in the upper side of each leaf of the spring, excepting the top one, which grooves, as shown in Fig. 1, extend nearly to the ends of the respective leaves of the spring.

The upper end of the bolt is provided with an internally threaded recess 11 for the insertion of a grease cup or the like. If desired, a connecting member 12 adapted to form a grease or oiltight connection between the oilway 8 and a grease gun (not shown) may be inserted in the recess 11.

By the arrangement described a grease gun may be attached to the member 12 and grease forced under great pressure through the oilway 8, slots 9 and into the several longitudinally extending grooves 10 thus thoroughly and effectively lubricating the co-engaging surfaces between each adjacent pair of leaves.

I claim:

The combination with a plurality of leaf springs provided with straight longitudinally extending ducts formed within their upper surfaces, of a bolt means for securely clamping said springs together and for conveying lubricant to all of the longitudinal ducts, said bolt having a head with an upward extension provided with a threaded opening to receive a lubricating grease fitting, the shank portion of said bolt passing through the center portions of said springs and having a central longitudinal duct which extends from the threaded opening downwardly to a point adjacent but not through the lowest spring, the shank portion also having a pair of opposite longitudinally extending slots which open laterally into the duct and into register with the inner ends of all of the spring ducts on opposite sides of the bolt, and a nut threaded on the lower end of the bolt for clamping the springs together.

In testimony whereof, I affix my signature.

BERNARD L. MAYER.